W. J. HAGMAN.
SCREW CLEANING MECHANISM FOR MACHINE TOOLS.
APPLICATION FILED MAR. 12, 1919.
1,370,743.
Patented Mar. 8, 1921.
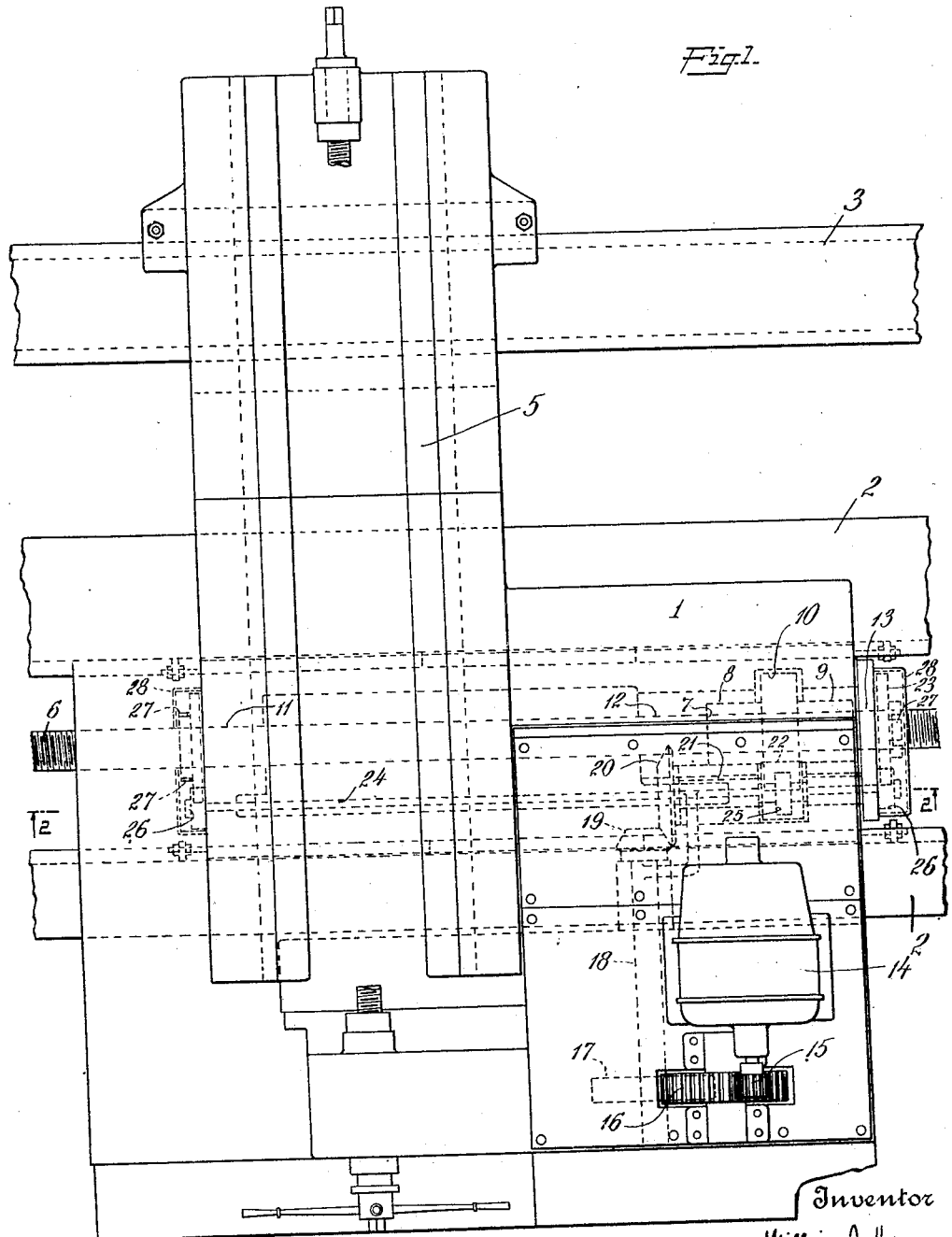

W. J. HAGMAN.
SCREW CLEANING MECHANISM FOR MACHINE TOOLS.
APPLICATION FILED MAR. 12, 1919.
1,370,743.
Patented Mar. 8, 1921.
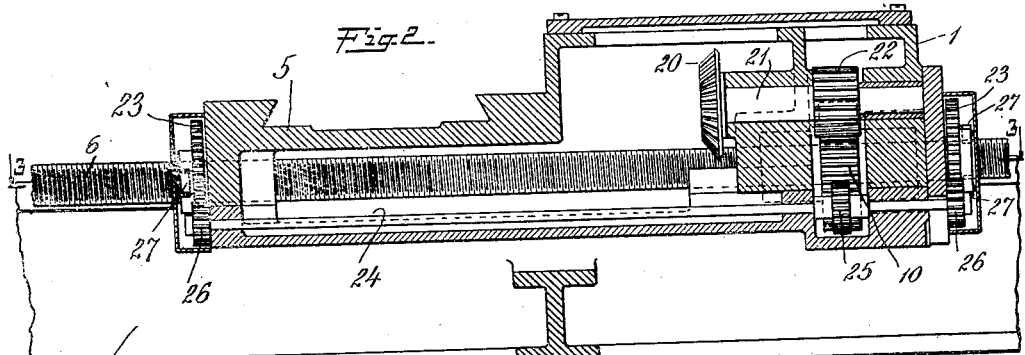
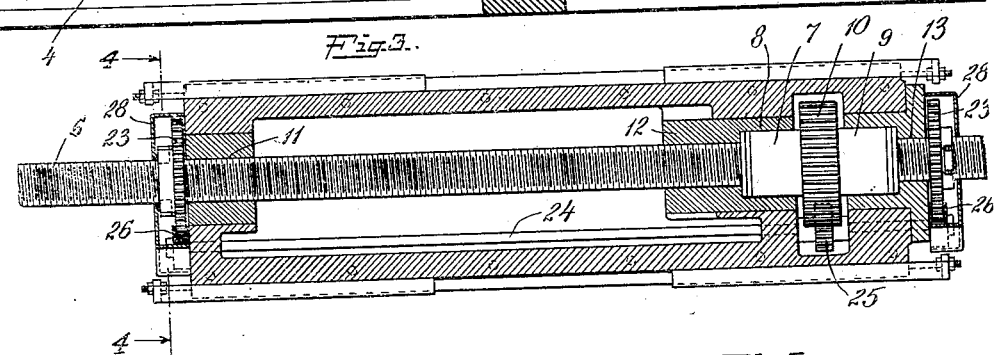
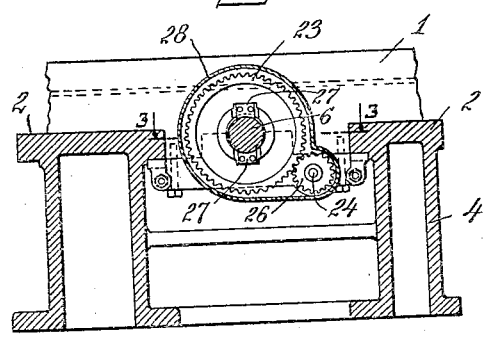
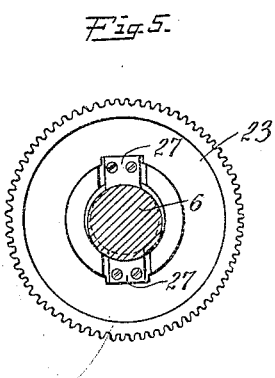
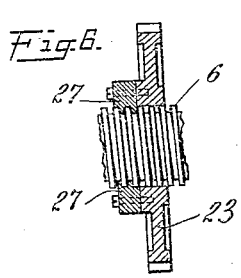
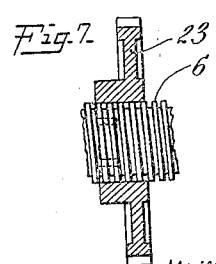
Inventor
William J. Hagman
By S. Jay Teller
Attorney

UNITED STATES PATENT OFFICE.

WILLIAM J. HAGMAN, OF PHILADELPHIA, PENNSYLVANIA, ASSIGNOR TO NILES-BEMENT-POND COMPANY, OF NEW YORK, N. Y., A CORPORATION OF NEW JERSEY.

SCREW-CLEANING MECHANISM FOR MACHINE-TOOLS.

1,370,743.   Specification of Letters Patent.   Patented Mar. 8, 1921.

Application filed March 12, 1919.  Serial No. 282,065.

*To all whom it may concern:*

Be it known that I, WILLIAM J. HAGMAN, a citizen of the United States, residing at Philadelphia, in the county of Philadelphia and State of Pennsylvania, have invented certain new and useful Improvements in Screw-Cleaning Mechanisms for Machine-Tools, of which the following is a specification.

The invention relates particularly to a machine tool having a movable carriage, a non-rotatable feed screw and a rotatable nut mounted on the carriage and engaging the screw for effecting carriage movement. In machine tools of this class as heretofore constructed, considerable difficulty has been experienced by reason of the accumulation of dirt and debris on the feed screw. This accumulation is greater for a non-rotating screw than for a rotating screw, as with a rotating screw the greater part of it falls off as the screw turns. The dirt which accumulates on the non-rotating screw works into the bearings of the carriage and into the feed nut, causing excessive wear and abrasion.

The object of the present invention is to provide in a machine tool of the class described one or more rotating cleaning devices which travel with the carriage and which serve to remove dirt and debris from the feed screw in advance of the carriage bearings and the nut.

In the accompanying drawings I have shown the invention applied to a lathe. It will be understood, however, that a lathe has been selected merely for purposes of illustration and that the invention can be applied to other machines having traveling carriages and non-rotating screws. The drawings, therefore, are not to be construed as defining or limiting the scope of the invention, the appended claims being relied upon for that purpose.

Of the drawings:

Figure 1 is a fragmentary plan view of a lathe having cleaning devices embodying the invention. In this view many of the lathe parts not essential to the present invention are omitted for the sake of simplicity.

Fig. 2 is a vertical longitudinal sectional view taken along the line 2—2 of Fig. 1.

Fig. 3 is a horizontal sectional view taken along the lines 3—3 of Figs. 2 and 4.

Fig. 4 is a fragmentary transverse sectional view taken along the line 4—4 of Fig. 3.

Fig. 5 is an enlarged end view of one of the cleaning devices.

Fig. 6 is an enlarged sectional view of one of the cleaning devices.

Fig. 7 is an enlarged sectional view taken at right angles to Fig. 6.

Referring to the drawings, 1 represents a lathe carriage which is adapted to travel along suitable ways 2, 2 and 3 on a bed 4. The carriage is provided with a transverse guideway 5 upon which may be mounted suitable cross slides and other devices for carrying the cutting tools. These devices constitute no part of my present invention and are therefore omitted from the drawings. Extending longitudinally of the bed is a non-rotatable feed screw 6. Mounted on the carriage and engaging the screw is a rotatable nut 7. As illustrated, this nut is fitted in bearings 8 and 9 on the carriage and is provided with a gear 10 between the bearings whereby it may be turned. Preferably the carriage is provided with other bearings 11, 12 and 13 which engage the screw at the opposite sides of the nut.

Suitable mechanism is provided for rotating the nut and, as illustrated, the nut is rotated by power derived from an electric motor 14 mounted on the carriage. It will be understood, however, that the invention is not limited to an electric motor for driving the nut. As conventionally illustrated, there is a pinion 15 on the drive shaft of the motor which meshes with an idler gear 16, this idler gear in turn meshing with a gear 17 on a transverse shaft 18. The shaft 18 carries at its rear end a bevel gear 19 which meshes with a bevel gear 20 on a longitudinal shaft 21. The shaft 21 carries a pinion 22 which meshes with the aforesaid gear 10 on the nut 7. It will be seen that by means of gearing such as described power may be transmitted from the motor to rotate the nut 7. When the nut rotates it moves the carriage in one direction or the other in accordance with the direction of rotation.

At one side of the nut there is a rotatable cleaning device engaging the screw, and preferably there are two such cleaning devices arranged on opposite sides of the nut. These cleaning devices are indicated in the drawings at 23, and by preference they are located outside of the bearings on the carriage. The cleaning devices have threaded engagement with the feed screw and I provide means whereby they are rotated in synchronism with the nut. As illustrated, each cleaning device is in the form of a spur gear having the same pitch diameter as the gear 10 on the nut. Extending longitudinally of the carriage and mounted in suitable bearings is a shaft 24. Carried by this shaft is a pinion 25 meshing with the gear 10 and two pinions 26 meshing respectively with the gear teeth on the cleaning devices 23, 23. It will be seen that when the nut is turned the cleaning devices 23, 23 will be turned at the same speed and will therefore be moved longitudinally along the screw at the same speed as the nut and the carriage. The cleaning devices are without direct longitudinal connection with the nut or with the carriage, but by reason of their synchronous rotation will nevertheless maintain the proper relationship with the carriage and the nut as all of the parts move along the screw.

Preferably the body part of each cleaning device 23 engages only the outside of the screw 6 and does not fit between the threads thereof. Carried by the body part of each device are two oppositely disposed cleaning fingers 27, 27 which are preferably constructed of soft metal and which are adapted to fit into the threads of the screw. These fingers 27, 27 serve not only to connect the cleaning devices with the screw but also to thoroughly clean the screw threads as the devices rotate.

Preferably guards 28, 28 are provided for inclosing the respective cleaning devices.

What I claim is:

1. In a machine tool, the combination of a movable carriage, a non-rotatable feed screw, a rotatable nut mounted on the carriage and engaging the screw, a cleaning device having threaded engagement with the screw, and means for rotating the said device in synchronism with the nut.

2. In a machine tool, the combination of a movable carriage, a non-rotatable feed screw, a rotatable nut mounted on the carriage and engaging the screw, a cleaning device having threaded engagement with the screw at a position remote from the nut, and means for rotating the said device in synchronism with the nut.

3. In a machine tool, the combination of a movable carriage, a non-rotatable feed screw, a rotatable nut mounted on the carriage and engaging the screw, two cleaning devices having threaded engagement with the screw at opposite sides of the nut and remote therefrom, and means for rotating the said devices in synchronism with the nut.

4. In a machine tool, the combination of a movable carriage, a non-rotatable feed screw, a bearing on the carriage engaging the screw, a rotatable nut mounted on the carriage and engaging the screw, a cleaning device having threaded engagement with the screw at the side of the bearing opposite the nut, and means for rotating the said device in synchronism with the nut.

5. In a machine tool, the combination of a movable carriage, a non-rotatable feed screw, two bearings on the carriage engaging the screw, a rotatable nut mounted on the carriage and engaging the screw between the bearings, two cleaning devices having threaded engagement with the screw outside of the bearings, and means for rotating the said devices in synchronism with the nut.

6. In a metal working machine, the combination of a movable carriage, a non-rotatable feed screw, a rotatable nut mounted on the carriage and engaging the screw, a cleaning device having threaded engagement with the screw at a position remote from the nut, the said nut and cleaning device being provided respectively with gear teeth, and gearing engaging the said gear teeth for rotating the said cleaning device in synchronism with the nut.

7. In a metal working machine, the combination of a movable carriage, a non-rotatable feed screw, a rotatable nut mounted on the carriage and engaging the screw, a cleaning device having threaded engagement with the screw at a position remote from the nut, the said nut and cleaning device being provided respectively with gear teeth having the same pitch diameter, a longitudinal shaft, and pinions on the shaft respectively engaging the gear teeth on the nut and on the cleaning device for rotating the said cleaning device in synchronism with the nut.

8. In a metal working machine, the combination of a movable carriage, a non-rotatable feed screw, a rotatable nut mounted on the carriage and engaging the screw, two cleaning devices having threaded engagement with the screw at opposite sides of the nut and remote therefrom, the said nut and cleaning devices being provided respectively with gear teeth all having the same pitch diameter, a longitudinal shaft, and pinions on the shaft respectively engaging the gear teeth on the nut and on the cleaning devices for rotating the said device in synchronism with the nut.

9. In a metal working machine, the combination of a movable carriage, a non-rotatable feed screw, a rotatable nut mounted on the carriage and engaging the screw, a cleaning device having engagement with the screw at a position remote from the nut, the said cleaning device having a body part engaging the outer surface of the screw and a cleaning finger fitting the threads of the screw, and means for rotating the said device in synchronism with the nut.

In testimony whereof, I hereto affix my signature.

WILLIAM J. HAGMAN.